US011293491B2

(12) United States Patent
Colson et al.

(10) Patent No.: US 11,293,491 B2
(45) Date of Patent: Apr. 5, 2022

(54) BEARING HOUSING FOR RAM AIR FAN

(71) Applicant: Hamilton Sundstrand Corporation, Charlotte, NC (US)

(72) Inventors: Darryl A. Colson, West Suffield, CT (US); Clarence J. Wytas, Stafford Springs, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1056 days.

(21) Appl. No.: 15/923,776

(22) Filed: Mar. 16, 2018

(65) Prior Publication Data

US 2019/0285119 A1    Sep. 19, 2019

(51) Int. Cl.
| | |
|---|---|
| *F04D 29/056* | (2006.01) |
| *F16C 35/04* | (2006.01) |
| *B64D 13/06* | (2006.01) |
| *F16C 37/00* | (2006.01) |
| *F04D 19/00* | (2006.01) |

(Continued)

(52) U.S. Cl.
CPC ............ *F16C 35/042* (2013.01); *B64D 13/06* (2013.01); *F01D 25/12* (2013.01); *F04D 19/00* (2013.01); *F04D 19/002* (2013.01); *F04D 25/0606* (2013.01); *F04D 29/056* (2013.01); *F04D 29/0563* (2013.01); *F16C 35/045* (2013.01); *F16C 37/00* (2013.01); *F16C 37/007* (2013.01); *H02K 5/161* (2013.01); *B64D 2013/0618* (2013.01); *F04D 29/584* (2013.01); *F16C 2240/70* (2013.01); *F16C 2326/43* (2013.01); *F16C 2360/46* (2013.01)

(58) Field of Classification Search
CPC ..................................................... F16C 35/042
See application file for complete search history.

(56) References Cited

U.S. PATENT DOCUMENTS 2,223,847 A * 12/1940 Mauritz ................ F04D 19/002
384/476
3,831,048 A    8/1974 Wagner
(Continued)

FOREIGN PATENT DOCUMENTS

JP        S59220041 A    12/1984

OTHER PUBLICATIONS

Extended European Search Report for European Patent Application No. 19163287.6, dated Jun. 17, 2019, 10 pages.
(Continued)

*Primary Examiner* — Kayla Mccaffrey
(74) *Attorney, Agent, or Firm* — Kinney & Lange, P.A.

(57) ABSTRACT

A bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion The outer housing portion includes a radially outer surface having a diameter Doh1, a radially inner surface having a diameter Doh2, and a shoulder on the first end of the outer housing portion and having a radially outer surface with a diameter Ds. Diameter Ds is smaller than the diameter Doh1 and larger than the diameter Doh2.

20 Claims, 6 Drawing Sheets

(51) Int. Cl.
  *H02K 5/16*  (2006.01)
  *F04D 25/06*  (2006.01)
  *F01D 25/12*  (2006.01)
  *F04D 29/58*  (2006.01)

(56) References Cited

U.S. PATENT DOCUMENTS

| | | | |
|---|---|---|---|
| 7,342,332 B2 * | 3/2008 | McAuliffe | H02K 9/06 |
| | | | 310/58 |
| 7,732,953 B2 | 6/2010 | Telakowski | |
| 8,784,048 B2 * | 7/2014 | Beers | F04D 25/024 |
| | | | 415/180 |
| 8,882,454 B2 | 11/2014 | Chrabascz et al. | |
| 9,109,625 B2 | 8/2015 | Colson et al. | |
| 9,243,643 B2 | 1/2016 | Beers et al. | |
| 9,556,885 B2 | 1/2017 | Beers et al. | |
| 2004/0169429 A1 | 9/2004 | Howe et al. | |
| 2013/0101402 A1 | 4/2013 | Rosen et al. | |
| 2014/0119908 A1 | 5/2014 | Chrabascz et al. | |
| 2016/0186771 A1 | 6/2016 | Evers et al. | |

OTHER PUBLICATIONS

Communication pursuant to Article 94(3) EPC for European Patent Application No. 19163287.6, dated Jul. 20, 2020, 6 pages.
Communication Pursuant to Article 94(3) EPC for European Patent Application No. 19163287.6, dated Mar. 22, 2021, 8 pages.

\* cited by examiner

BEARING HOUSING FOR RAM AIR FAN

BACKGROUND

The present invention relates to an environmental control system. In particular, the invention relates to a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan. As with any system aboard an aircraft, there is great value in an improved ram air fan that includes innovative components designed to improve the operational efficiency of the ram air fan and to reduce its weight.

SUMMARY

A bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion The outer housing portion includes a radially outer surface having a diameter $Doh1$, a radially inner surface having a diameter $Doh2$, and a shoulder on the first end of the outer housing portion and having a radially outer surface with a diameter $Ds$. Diameter $Ds$ is smaller than the diameter $Doh1$ and larger than the diameter $Doh2$.

A bearing housing for a ram air fan includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connecting the second end of the outer housing portion to the second end of the inner housing portion. The disk portion includes first cooling holes extending through the disk portion and having a diameter $Dh1$, and second cooling holes extending through the disk portion and having a diameter $Dh2$ that is smaller than the diameter $Dh1$.

A ram air fan includes a tie rod with a first end and a second end, a motor including a rotor that rotates with the tie rod and a stator positioned radially around the rotor, a fan housing positioned adjacent the first end of the tie rod, and a bearing housing adjacent the second end of the tie rod. The bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion The outer housing portion includes a radially outer surface, a radially inner surface opposite of the radially outer surface, and a shoulder on the first end of the outer housing portion. The shoulder has a radially outer surface that is configured to mate with the fan housing.

A ram air fan includes a tie rod with a first end and a second end, a motor including a rotor that rotates with the tie rod and a stator positioned radially around the rotor, a fan housing positioned adjacent the first end of the tie rod, and a bearing housing adjacent the second end of the tie rod. The bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion. The disk portion includes first cooling holes extending through the disk portion and having a diameter $Dh1$, and second cooling holes extending through the disk portion and having a diameter $Dh2$ that is smaller than the diameter $Dh1$.

DETAILED DESCRIPTION

Figure 1:
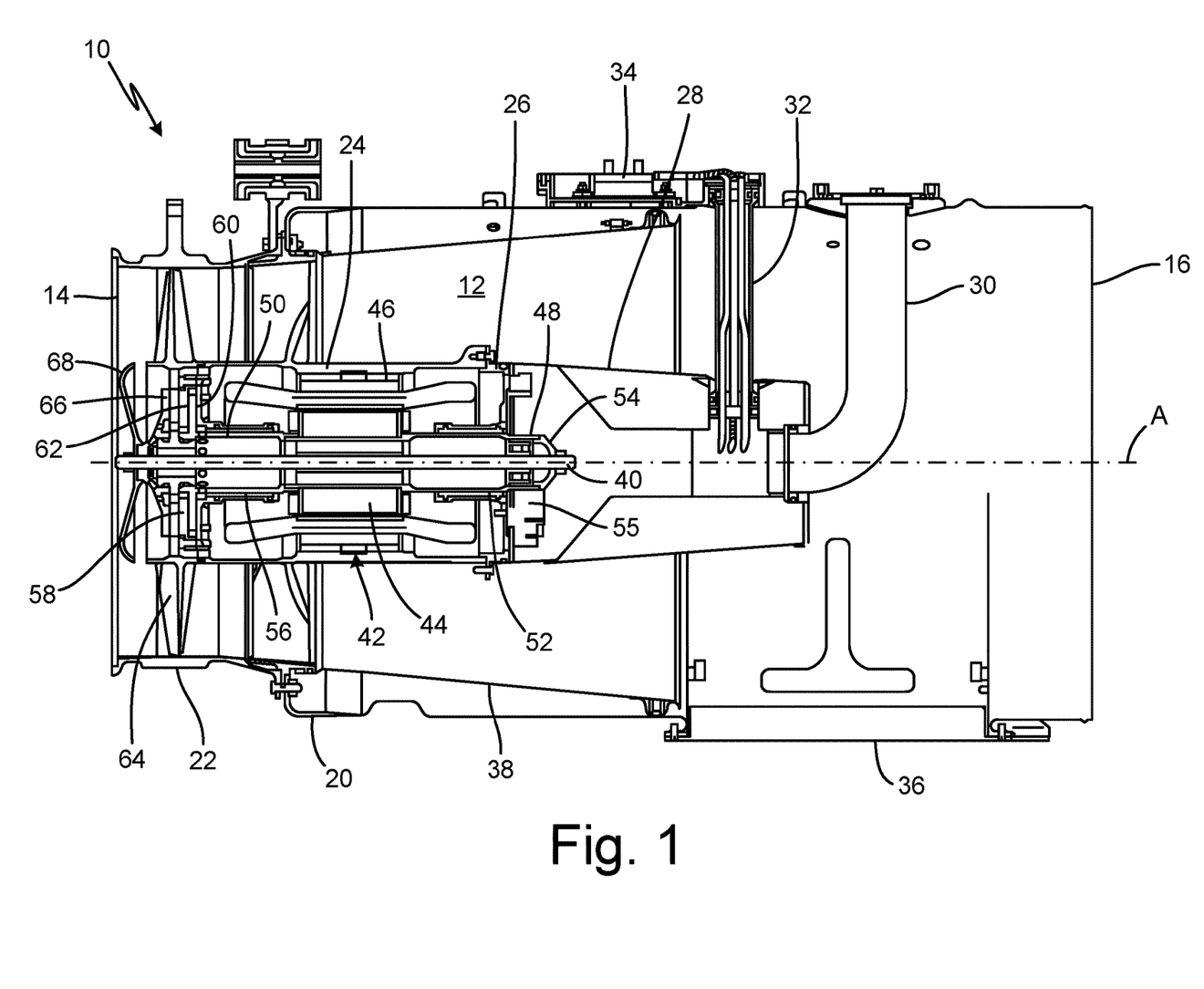
FIG. 1 is a cross-sectional view of a ram air fan.

FIG. 1 is a cross-sectional view of ram air fan 10. Ram air fan 10 includes ram air flow path 12, ram air inlet 14, and ram air outlet 16. Ram air fan 10 further includes outer housing 20, inlet housing 22, fan housing 24, bearing housing 26, inner housing 28, motor bearing cooling tube 30, wire transfer tube 32, terminal box 34, check valve 36, diffuser 38, tie rod 40, motor 42, motor rotor 44, motor stator 46, journal bearing shaft 48, thrust shaft 50, first journal bearing 52, shaft cap 54, speed sensor 55, second journal bearing 56, thrust plate 58, first thrust bearing 60, second thrust bearing 62, fan rotor 64, hub 66, and inlet shroud 68. Axis A extends along a central axis ram air fan 10.

Ram air fan 10 includes ram air flow path 12 that extends between ram air inlet 14 and ram air outlet 16. Outer housing 20 and inlet housing 22 are attached form a housing of ram air fan 10. Ram air inlet 14 is positioned at an upstream end of inlet housing 22, and ram air outlet 16 is positioned at a downstream end of outer housing 20. Fan housing 24, bearing housing 26, and inner housing 28 are held within outer housing 20 and inlet housing 22. Fan housing 24 has fan struts that are bolted between outer housing 20 and inlet housing 22 to attach fan housing 24 to outer housing 20 and inlet housing 22. An upstream end of bearing housing 26 is bolted to a downstream end of fan housing 24. An upstream end of inner housing 28 is attached to a downstream end of bearing housing 26.

Motor bearing cooling tube 30 is connected to and extends between inner housing 28 and outer housing 20. Motor bearing cooling tube 30 provides a source of cooling air to ram air fan 10. Wire transfer tube 32 is connected to and extends between inner housing 28 and outer housing 20. Terminal box 34 is positioned on an outer surface of outer housing 20. Wire transfer tube 32 is connected to terminal box 34. Check valve 36 is positioned in outer housing 20. Diffuser 38 is attached to an inner surface of outer housing 18.

Tie rod 40 extends through fan housing 24, bearing housing 26, and inner housing 28. Tie rod 40 is centered on axis A. Motor 42 is positioned around tie rod 40. Motor 42 includes motor rotor 44 and motor stator 46 positioned radially outwards from motor rotor 44. Motor rotor 44 rotates with tie rod 40. Motor stator 46 is a static component that is attached to fan housing 24.

Journal bearing shaft 48 is attached to a downstream end of motor rotor 44. Thrust shaft 50 is attached to an upstream end of motor rotor 44. Journal bearing shaft 48, motor rotor 44, and thrust shaft 50 define an axis of rotation for ram air fan 10. First journal bearing 52 is positioned on a downstream end of motor 42 between journal bearing shaft 48 and bearing housing 26. Shaft cap 54 is positioned on a downstream end of journal bearing shaft 48. Shaft cap 54 is secured to journal bearing shaft 48 with nuts. Speed sensor 55 is mounted to bearing housing 26 adjacent to first journal bearing shaft 48 and shaft cap 54.

Second journal bearing 56 is positioned on an upstream end of motor 42 between thrust shaft 50 and fan housing 24. Thrust plate 58 is a static component that is bolted to fan housing 24. Thrust plate 58 is positioned on an upstream end of a flange portion of thrust shaft 50. First thrust bearing 60 is positioned between the flange portion of thrust shaft 50 and fan housing 24. Second thrust bearing 62 is positioned between flange portion of thrust shaft 50 and thrust plate 58. Fan rotor 64 is positioned around tie rod 40 on an upstream end of thrust plate 58. Hub 66 is positioned on an upstream end of fan rotor 64, and inlet shroud 68 is positioned on an upstream end of hub 66. Hub 66 and inlet shroud 68 are secured to fan rotor 64 with nuts. Fan rotor 64, hub 66, inlet shroud 68, and a portion of fan housing 24 are contained within inlet housing 22.

In operation, ram air fan 10 is installed into an environmental control system (ECS) aboard an aircraft. When the aircraft does not move fast enough to generate sufficient ram air pressure to meet the cooling needs of the ECS, power is supplied to motor 42 by wires running from terminal box 34, through wire transfer tube 32, inner housing 28, and bearing housing 26. The power energizes motor stator 44, which causes rotor 42 to rotate about axis A of ram air fan 10. This in turn rotates journal bearing shaft 48 and thrust shaft 50, which are connected to motor rotor 44. Fan rotor 64, hub 66, and inlet shroud 68 also rotate by way of their connection to thrust shaft 50. First journal bearing 52, second journal bearing 56, first thrust bearing 60, and second thrust bearing 62 provide low friction support for the rotating components. As fan rotor 64 rotates, it moves air from ram air inlet 14 into ram air flow path 12, which includes moving the air through inlet housing 22, past the fan struts of fan housing 24, and into the space between fan housing 24 and outer housing 20. This increases the air pressure in outer housing 20. As the air moves through ram air flow path 12, it flows across diffuser 38 and inner housing 28, where the static pressure increases due to the shape of diffuser 38 and the shape of inner housing 28. Once the air flows across inner housing 28, it moves out of outer housing 20 at ram air outlet 16.

Components within bearing housing 26 and fan housing 24, especially motor 42, first journal bearing 52, second journal bearing 56, first thrust bearing 60, and second thrust bearing 62, generate significant heat and must be cooled. Cooling air is provided by motor bearing cooling tube 30 which directs a flow of cooling air to inner housing 28. Inner housing 28 directs the flow of cooling air to bearing housing 26, where it flows past components in bearing housing 26 and fan housing 24 to cool motor 42, first journal bearing 52, second journal bearing 56, first thrust bearing 60, and second thrust bearing 62. The cooling air then exits fan housing 24 through cooling holes in fan rotor 64 and hub 66. The cooling air is directed upwards into ram air flow path 12 between hub 66 and inlet shroud 68.

Figure 2A:
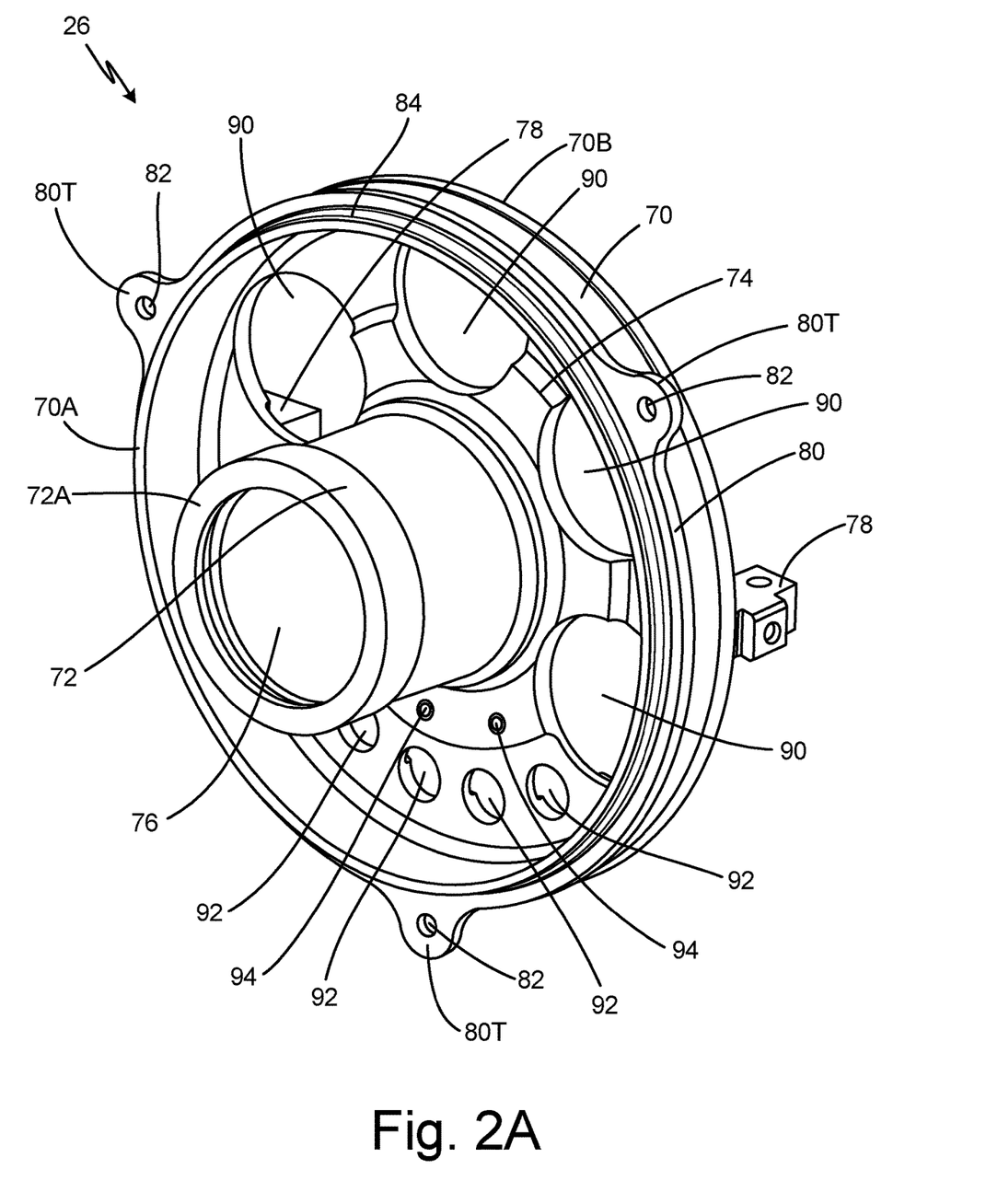
FIG. 2A is a perspective view of a bearing housing.
Figure 2B:
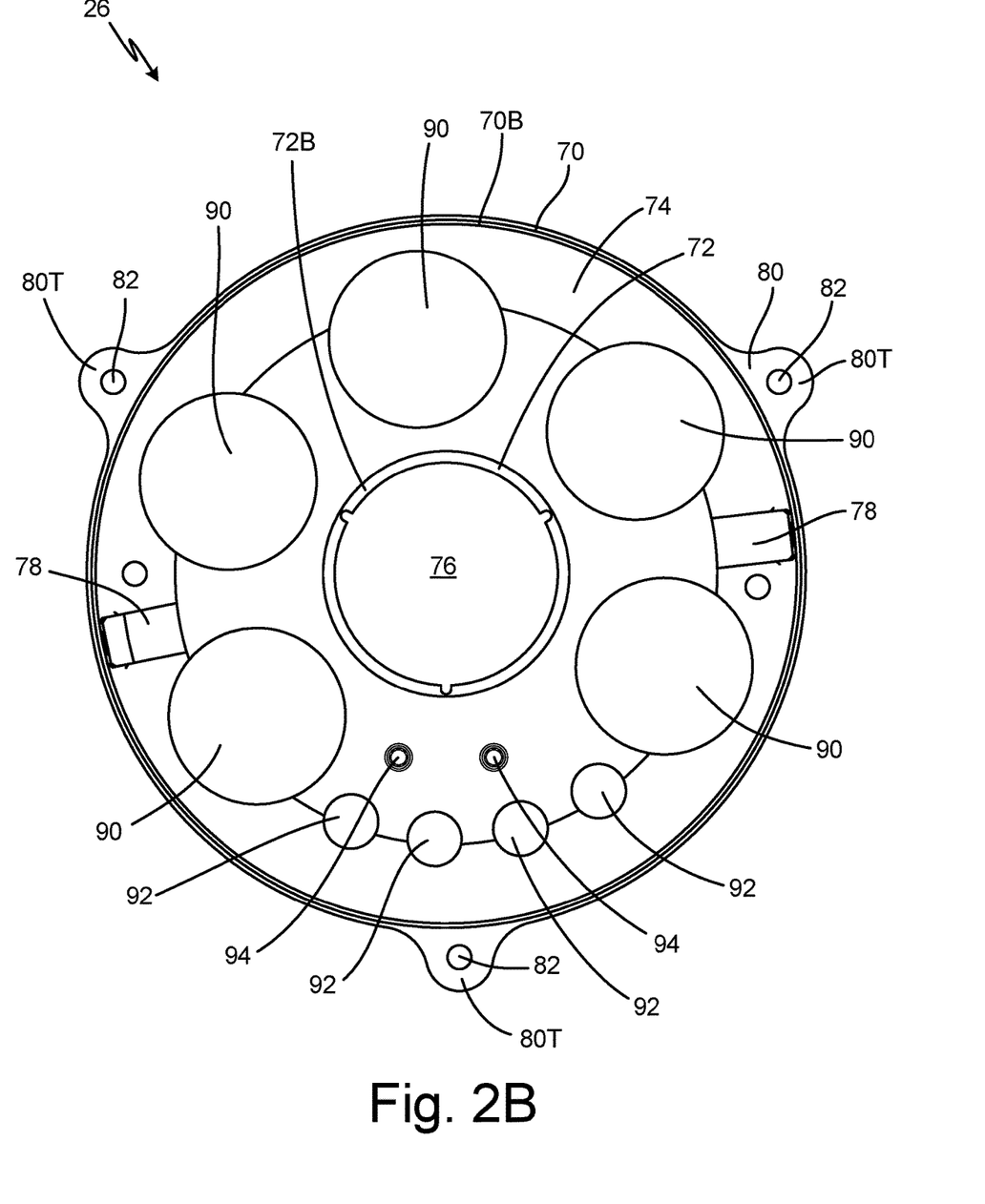
FIG. 2B is a back plan view of the bearing housing.

FIG. 2A is a perspective view of bearing housing 26. FIG. 2B is a back plan view of bearing housing 26. Bearing housing 26 includes outer housing portion 70, inner housing portion 72, disk portion 74, bore 76, mounts 78, mounting flange 80, tabs 80T, bolt holes 82, shoulder 84 (shown in FIG. 2A), large cooling holes 90, small cooling holes 92, and threaded holes 94.

Bearing housing 26 is made out of aluminum in the embodiment shown. Bearing housing 26 includes outer housing portion 70 that is positioned radially outwards from inner housing portion 72. Outer housing portion 70 has first end 70A and second end 70B positioned away from first end 70A. Inner housing portion 72 has first end 72A and second end 72B positioned away from first end 72A. Disk portion 74 extends between and connects second end 70B of outer housing portion 70 to second end 72B of inner housing portion 72. A radially outer surface of disk portion 74 is connected to a radially inner surface of outer housing portion 70, and a radially inner surface of disk portion 74 is connected to a radially outer surface of inner housing portion 72.

Bore 76 extends through inner housing portion 72. Bore 76 receives first journal bearing 52 of ram air fan 10 (shown in FIG. 1) so that inner housing portion 72 is positioned radially around first journal bearing 52. Mounts 78 are positioned on a downstream side of disk portion 74. Wire supports carrying wires used to connect motor 42 to terminal box 34 (shown in FIG. 1) are connected to mounts 78 to hold the wires in place in ram air fan 10 (shown in FIG. 1). Mounts 78 are also used to mount inner housing 28 (shown in FIG. 1) to bearing housing 26.

Outer housing portion 70 is a ring-shaped member. First end 70A of outer housing portion 70 mates with fan housing 24 (shown in FIG. 1), and second end 70B of outer housing portion 70 mates with inner housing 28 (shown in FIG. 1). Mounting flange 80 extends radially outward from outer housing portion 70. Mounting flange 80 includes tabs 80T positioned around mounting flange 80. Bolts holes 82 extend through mounting flange 80 at tabs 80T. There are three bolt holes 82 and three tabs 80T in mounting flange 80 in the embodiment shown in FIG. 2A. Shoulder 84 is on first end 70A of outer housing portion 70 adjacent to mounting flange 80. Mounting flange 80, bolt holes 82, and shoulder 84 are configured to mount bearing housing 26 to fan housing 24 (shown in FIG. 1).

Disk portion 84 includes large cooling holes 90, small cooling holes 92, and threaded holes 94. Large cooling holes 90, small cooling holes 92, and threaded holes 94 are openings that extend from an upstream end to a downstream end of disk portion 84. There are five large cooling holes 90 in the embodiment shown in FIGS. 2A-2B. There are four small cooling holes 92 in the embodiment shown in FIGS. 2A-2B. Large cooling holes 90 and small cooling holes 92 are configured to allow cooling air to flow through bearing housing 26 to cool motor 42, first journal bearing 52, second journal bearing 56, first thrust bearing 60, and second thrust bearing 62 (shown in FIG. 1). Threaded holes 94 are positioned adjacent to small cooling holes 92. Speed sensor 55 (shown in FIG. 1) is mounted to bearing housing 26 with threaded holes 94. Small cooling holes 92 are positioned adjacent to threaded holes 94 and speed sensor 55.

Bearing housing 26 is positioned around first journal bearing 52 of ram air fan 10 (shown in FIG. 1). Further, bearing housing 26 connects fan housing 24 to inner housing 28 (shown in FIG. 1). Bolts extend through bolts holes 82 in mounting flange 80 to mount bearing housing 26 to fan housing 24. A radially inner surface of a downstream end of fan housing 24 sits against shoulder 84 when fan housing 24 is mounted to bearing housing 26. Bearing housing 26 includes first cooling holes 80 and second cooling holes 92 to allow cooling air to flow through bearing housing 26 to cool motor 42, first journal bearing 52, second journal bearing 56, first thrust bearing 60, and second thrust bearing 62 (shown in FIG. 1).

Figure 3A:
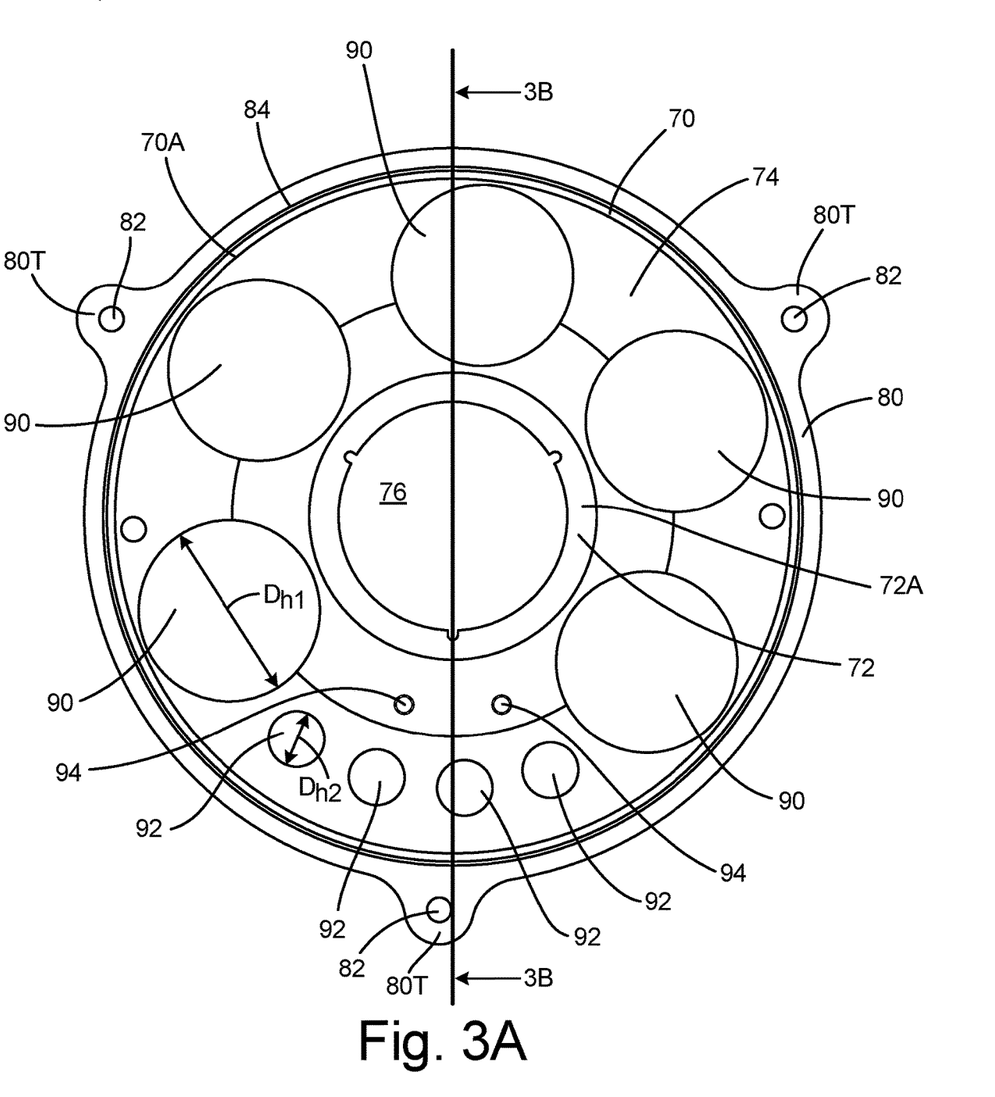
FIG. 3A is a front plan view of the bearing housing.
Figure 3B:
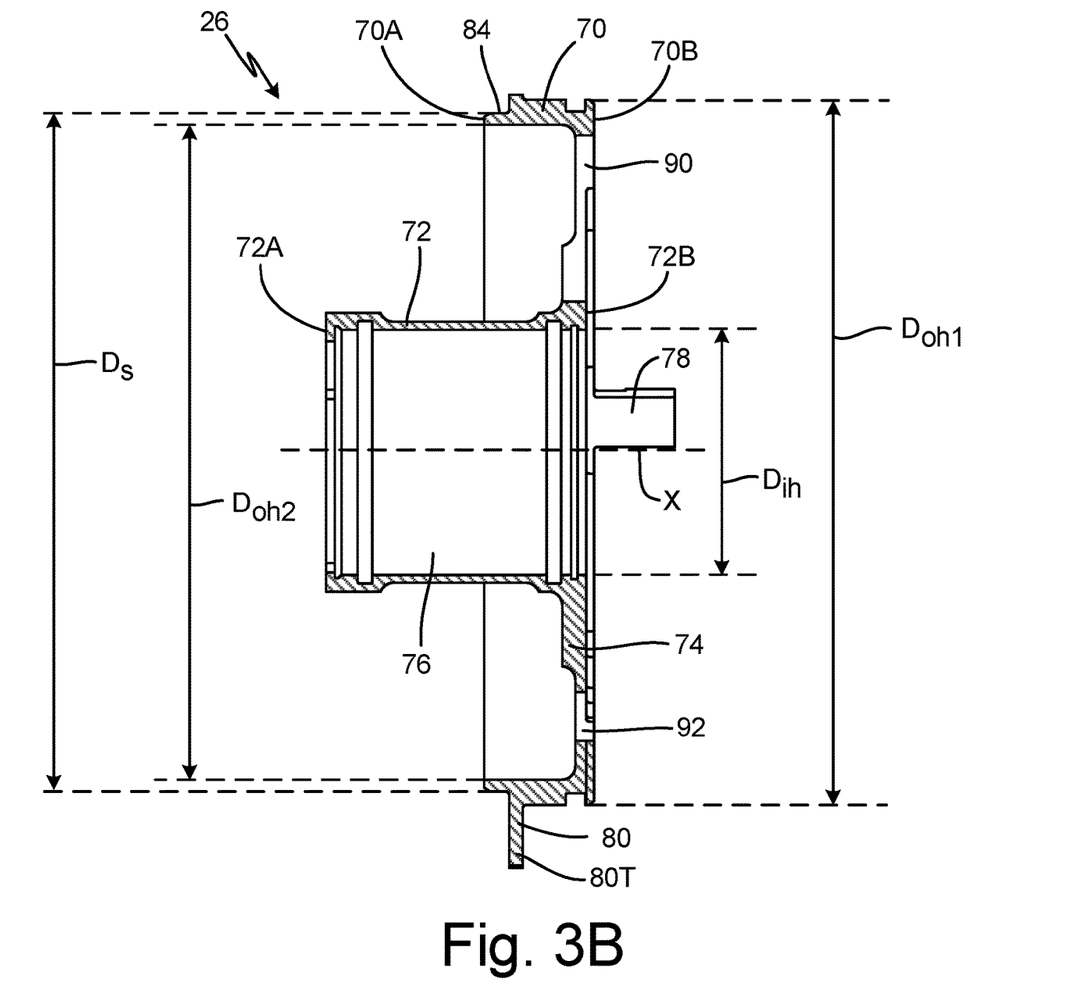
FIG. 3B is a cross-sectional view of the bearing housing taken along line 3B-3B of FIG. 3A.

FIG. 3A is a front plan view of bearing housing 26. FIG. 3B is a cross-sectional view of bearing housing 26 taken along line 3B-3B of FIG. 3A. Bearing housing 26 includes outer housing portion 70, inner housing portion 72, disk portion 74, bore 76, mounts 78 (shown in FIG. 3B), mounting flange 80, tabs 80T, bolt holes 82 (shown in FIG. 3A), shoulder 84, large cooling holes 90, small cooling holes 92, and threaded holes 94 (shown in FIG. 3A). FIG. 3A shows diameter Dh1 and diameter Dh2. FIG. 3B shows diameter Dih, diameter Doh1, diameter Doh2, diameter Ds, and axis X.

Bearing housing 26 has central axis X extending axially through bearing housing 26. Bearing housing 26 includes outer housing portion 70 that is positioned radially outwards from inner housing portion 72. Outer housing portion 70 includes first end 70A and second end 70B. Inner housing portion 72 includes first end 72A and second end 72B. Outer housing portion 70 and inner housing portion 72 are centered on and extend along axis X. Disk portion 74 extends between and connects outer housing portion 70 to inner housing portion 72. Bore 76 extends through inner housing portion 72. Mounts 78 are positioned on a downstream side of disk portion 74.

Mounting flange 80 extends radially outward from outer housing portion 70 and includes tabs 80T. Bolts holes 82 extend through mounting flange 80 at tabs 80T. Shoulder 84 is on first end 70A of outer housing portion 70 adjacent to mounting flange 80. Shoulder 84 is a lip formed on first end 70A of outer housing portion 70 adjacent to mounting flange 80.

Disk portion 74 includes large cooling holes 90, small cooling holes 92, and threaded holes 94. Large cooling holes 90 include five large cooling holes 90 and small cooling holes 92 include four small cooling holes 92.

Large cooling holes 90 have diameter Dh1. Diameter Dh1 is between 1.615 inches (4.1021 centimeters) and 1.635 inches (4.1529 centimeters). Small cooling holes 92 have diameter Dh2. Diameter Dh2 is between 0.49 inches (1.2446 centimeters) and 0.51 inches (1.2954 centimeters). Diameter Dh1 is larger than diameter Dh2. A ratio of diameter Dh1 to diameter Dh2 is between 3.1667 and 3.3367.

A radially inner surface of inner housing portion 72 has diameter Dih. Diameter Dih is between 2.26 inches (5.7404 centimeters) and 2.262 inches (5.7455 centimeters). A radially outer surface of outer housing portion 70 has diameter Doh1. Diameter Doh1 is between 6.513 inches (16.543 centimeters) and 6.517 inches (16.5532 centimeters). A radially inner surface of outer housing portion 70 has diameter Doh2. Diameter Doh2 is between 6.045 inches (15.3543 centimeters) and 6.055 inches (15.3797 centimeters). A radially outer surface of shoulder 84 has a diameter Ds. Diameter Ds is between 6.264 inches (15.9106 centimeters) and 6.266 inches (15.9156 centimeters). Diameter Doh1, diameter Doh2, and diameter Ds are larger than diameter Dih. Diameter Doh1 and diameter Ds are larger than diameter Doh2. Diameter Doh1 is larger than diameter Ds. Diameter Ds is smaller than diameter Doh1 and larger than diameter Doh2. A ratio of diameter Ds to diameter Doh2 is between 1.0345 and 1.0366. A ratio of diameter Ds to diameter Doh1 is between 0.9612 and 0.9621. A ratio of diameter Ds to diameter Dih is between 2.7692 and 2.7726. A ratio of diameter Doh1 to diameter Dih is between 2.8793 and 2.8836.

Large cooling holes 90 and small cooling holes 92 in disk portion 74 of bearing housing 26 allow cooling air to flow through bearing housing 26 to cool motor 42, first journal bearing 52, second journal bearing 56, first thrust bearing 60, and second thrust bearing 62 (shown in FIG. 1). Large cooling holes 90 allow a large amount of cooling air to flow through. Speed sensor 55 (shown in FIG. 1) is mounted to bearing housing 26 with threaded holes 94. Large cooling holes 90 are not positioned adjacent to speed sensor 55, as cooling air does not flow through speed sensor 55, and disk portion 74 of bearing housing 26 needs to support the weight of speed sensor 55. Smaller cooling holes 92 are positioned radially outward from threaded holes 94 and speed sensor 55 to allow cooling air to flow through bearing housing 26 in an area in which large cooling holes 90 are not located.

Bearing housing 26 is mounted to fan housing 24 (shown in FIG. 1) with mounting flange 80, bolt holes 82, and shoulder 84 on outer housing portion 70. A downstream end of fan housing 24 is positioned around shoulder 84 so that a radially inner surface of the downstream end of fan housing 24 abuts the radially outer surface of shoulder 84. The downstream end of fan housing 24 also abuts mounting flange 80 in an axial direction and fan housing 24 is mounted to bearing housing 26 with bolts.

Shoulder 84 creates a concentric fit between bearing housing 26 and fan housing 24. Bearing housing 26 and fan housing 24 need to have a concentric fit to create alignment between bearing housing 26 and fan housing 24. Bearing housing 26 radially surrounds first journal bearing 52, and fan housing 24 radially surrounds second journal bearing 56. Aligning bearing housing 26 and fan housing 24 creates alignment between first journal bearing 52 and second journal bearing 56.

Bearing housing 26 provides the following benefits. First cooling holes 90 and second cooling holes 92 allow cooling air to flow through bearing housing 26 to cool motor 42, first journal bearing 52, second journal bearing 56, first thrust bearing 60, and second thrust bearing 62 (shown in FIG. 1).

Further, shoulder 84 on outer housing portion 70 creates a concentric fit between bearing housing 26 and fan housing 24 (shown in FIG. 1) to create alignment between first journal bearing 52 and second journal bearing 56.

Figure 4:
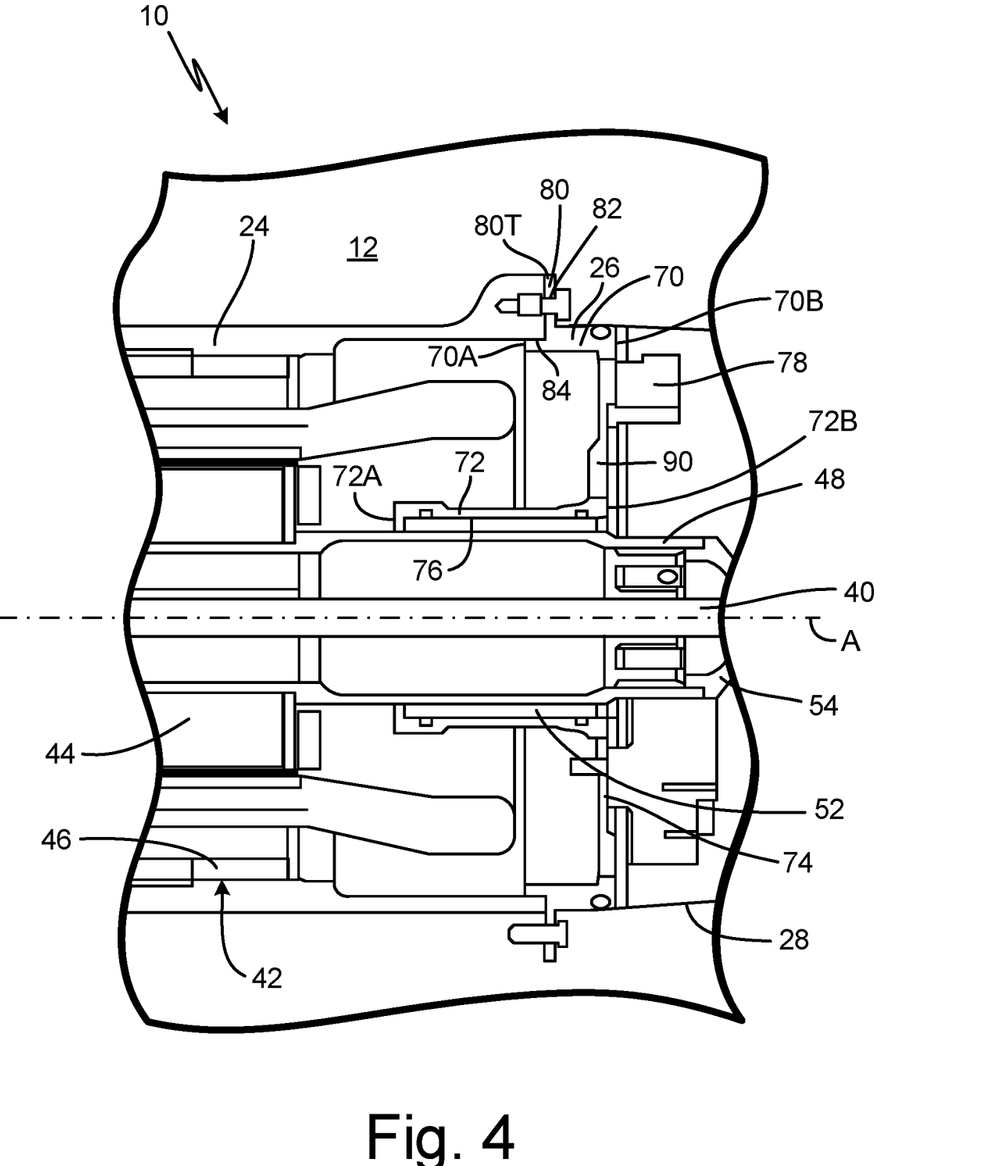
FIG. 4 is an enlarged cross-sectional view of the bearing housing bolted to a fan housing.

FIG. 4 is an enlarged cross-sectional view of bearing housing 26 bolted to fan housing 24. Ram air fan 10 includes ram air flow path 12, fan housing 24, bearing housing 26, inner housing 28, tie rod 40, motor 42, motor rotor 44, motor stator 46, journal bearing shaft 48, first journal bearing 52, and shaft cap 54. Axis A extends along a central axis ram air fan 10. Bearing housing 26 includes outer housing portion 70, inner housing portion 72, disk portion 74, bore 76, mounts 78, mounting flange 80, tabs 80T, bolt holes 82, shoulder 84, and large cooling holes 90.

Ram air fan 10 is described in reference to FIG. 1. Bearing housing 26 is described in reference to FIGS. 2A-3B. As shown in FIG. 4, outer housing portion 70 of bearing housing 26 is positioned downstream of motor stator 46. A downstream portion of fan housing 24 radially surrounds motor stator 46. A downstream end of fan housing 24 sits against shoulder 84 in a radially direction and against mounting flange 80 in an axial direction. A radially inner surface of the downstream end of fan housing 24 abuts the radially outer surface of shoulder 84. Shoulder 84 creates a concentric fit between bearing housing 26 and fan housing 24.

Mounting flange 80 extends radially outwards from outer housing portion 70 of bearing housing 26. Mounting flange 80 includes tabs 80T. Bolt holes 82 extend through mounting flange 80 at tabs 80T. One bolt extends through each bolt hole 82 in mounting flange 80 of bearing housing 26 and into fan housing 24 to mounting bearing housing 26 to fan housing 24.

Discussion of Possible Embodiments

The following are non-exclusive descriptions of possible embodiments of the present invention.

A bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion. The outer housing portion includes a radially outer surface having a diameter Doh1, a radially inner surface having a diameter Doh2, and a shoulder on the first end of the outer housing portion and having a radially outer surface with a diameter Ds. Diameter Ds is smaller than the diameter Doh1 and larger than the diameter Doh2.

The bearing housing of the preceding paragraph can optionally include, additionally and/or alternatively, any one or more of the following features, configurations and/or additional components:

A ratio of the diameter Ds to the diameter Doh1 is between 0.9612 and 0.9621.

A ratio of the diameter Ds to the diameter Doh2 is between 1.0345 and 1.0366.

The diameter Doh1 is between 6.513 inches (16.543 centimeters) and 6.517 inches (16.5532 centimeters).

The diameter Doh2 is between 6.045 inches (15.3543 centimeters) and 6.055 inches (15.3797 centimeters).

The diameter Ds is between 6.264 inches (15.9106 centimeters) and 6.266 inches (15.9156 centimeters).

The inner housing portion includes a radially inner surface with a diameter Dih.

A ratio of the diameter Ds to the diameter Dih is between 2.7692 and 2.7726.

A ratio of the diameter Doh1 to the diameter Dih is between 2.8793 and 2.8836.

The diameter Dih is between 2.26 inches (5.7404 centimeters) and 2.262 inches (5.7455 centimeters).

The bearing housing further includes a mounting flange extending radially outwards from the outer housing portion with tabs, and bolt holes extending through the mounting flange at the tabs.

The bearing housing has three tabs and three bolt holes in the mounting flange.

The disk portion includes first cooling holes extending through the disk portion, the first cooling holes having a diameter Dh1, and second cooling holes extending through the disk portion, the second cooling holes having a diameter Dh2 that is smaller than the diameter Dh1.

The disk portion includes five of the first cooling holes and four of the second cooling holes.

A ratio of the diameter Dh1 to the diameter Dh2 is between 3.1667 and 3.3367.

The diameter Dh1 is between 1.615 inches (4.1021 centimeters) and 1.635 inches (4.1529 centimeters).

The diameter Dh2 is between 0.49 inches (1.2446 centimeters) and 0.51 inches (1.2954 centimeters).

A bearing housing for a ram air fan includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion The disk portion includes first cooling holes extending through the disk portion and having a diameter Dh1, and second cooling holes extending through the disk portion and having a diameter Dh2 that is smaller than the diameter Dh1.

The bearing housing of the preceding paragraph can optionally include, additionally and/or alternatively, any one or more of the following features, configurations and/or additional components:

The disk portion includes five of the first cooling holes and four of the second cooling holes.

A ratio of the diameter Dh1 to the diameter Dh2 is between 3.1667 and 3.3367.

The diameter Dh1 is between 1.615 inches (4.1021 centimeters) and 1.635 inches (4.1529 centimeters).

The diameter Dh2 is between 0.49 inches (1.2446 centimeters) and 0.51 inches (1.2954 centimeters).

The outer housing portion includes a radially outer surface with a diameter Doh1, a radially inner surface opposite of the radially outer surface, the radially inner surface having a diameter Doh2, and a shoulder on the first end of the outer housing portion, the shoulder having a radially outer surface with a diameter Ds that is smaller than the diameter Doh1 and larger than the diameter Doh2.

A ratio of the diameter Ds to the diameter Doh1 is between 0.9612 and 0.9621.

A ratio of the diameter Ds to the diameter Doh2 is between 1.0345 and 1.0366.

The diameter Doh1 is between 6.513 inches (16.543 centimeters) and 6.517 inches (16.5532 centimeters).

The diameter Doh2 is between 6.045 inches (15.3543 centimeters) and 6.055 inches (15.3797 centimeters).

The diameter Ds is between 6.264 inches (15.9106 centimeters) and 6.266 inches (15.9156 centimeters).

The bearing housing further includes a mounting flange extending radially outwards from the outer housing portion with tabs, and bolt holes extending through the mounting flange at the tabs.

The bearing housing has three tabs and three bolt holes in the mounting flange.

The inner housing portion includes a radially inner surface with a diameter Dih.

A ratio of the diameter Ds to the diameter Dih is between 2.7692 and 2.7726.

A ratio of the diameter Doh1 to the diameter Dih is between 2.8793 and 2.8836.

The diameter Dih is between 2.26 inches (5.7404 centimeters) and 2.262 inches (5.7455 centimeters).

A ram air fan includes a tie rod with a first end and a second end, a motor including a rotor that rotates with the tie rod and a stator positioned radially around the rotor, a fan housing positioned adjacent the first end of the tie rod, and a bearing housing adjacent the second end of the tie rod. The bearing housing includes an inner housing portion centered on a central axis and an outer housing portion centered on the central axis. The inner housing portion has a first end and a second end positioned axially away from the first end. The outer housing portion has a first end and a second end positioned axially away from the first end. A disk portion connects the second end of the outer housing portion to the second end of the inner housing portion The outer housing portion includes a radially outer surface, a radially inner surface opposite of the radially outer surface, and a shoulder on the first end of the outer housing portion. The shoulder has a radially outer surface that is configured to mate with the fan housing.

The ram air fan of the preceding paragraph can optionally include, additionally and/or alternatively, any one or more of the following features, configurations and/or additional components:

The radially outer surface of the outer housing portion has a diameter Doh1.

The radially inner surface of the outer housing portion has a diameter Doh2.

The radially outer surface of the shoulder of the outer housing portion has a diameter Ds that is smaller than the diameter Doh1 and larger than the diameter Doh2.

A ratio of the diameter Ds to the diameter Doh1 is between 0.9612 and 0.9621.

A ratio of the diameter Ds to the diameter Doh2 is between 1.0345 and 1.0366.

The diameter Doh1 is between 6.513 inches (16.543 centimeters) and 6.517 inches (16.5532 centimeters).

The diameter Doh2 is between 6.045 inches (15.3543 centimeters) and 6.055 inches (15.3797 centimeters).

The diameter Ds is between 6.264 inches (15.9106 centimeters) and 6.266 inches (15.9156 centimeters).

The bearing housing further includes a mounting flange extending radially outwards from the outer housing portion with tabs, and bolt holes extending through the mounting flange at the tabs.

The bearing housing has three tabs and three bolt holes in the mounting flange.

The inner housing portion includes a radially inner surface with a diameter Dih.

A ratio of the diameter Ds to the diameter Dih is between 2.7692 and 2.7726.

A ratio of the diameter Doh1 to the diameter Dih is between 2.8793 and 2.8836.

The diameter Dih is between 2.26 inches (5.7404 centimeters) and 2.262 inches (5.7455 centimeters).

The disk portion includes first cooling holes extending through the disk portion, the first cooling holes having a diameter Dh1, and second cooling holes extending through the disk portion, the second cooling holes having a diameter Dh2 that is smaller than the diameter Dh1.

The disk portion includes five of the first cooling holes and four of the second cooling holes.

A ratio of the diameter Dh1 to the diameter Dh2 is between 3.1667 and 3.3367.

The diameter Dh1 is between 1.615 inches (4.1021 centimeters) and 1.635 inches (4.1529 centimeters).

The diameter Dh2 is between 0.49 inches (1.2446 centimeters) and 0.51 inches (1.2954 centimeters).

The ram air fan further includes a journal bearing shaft positioned radially around the second end of the tie rod; a first journal bearing positioned between the journal bearing shaft and the bearing housing; a thrust shaft positioned radially around the first end of the tie rod; a fan rotor attached to a first end of the tie rod that rotates with the tie rod; a second journal bearing positioned between the fan housing and the thrust shaft; a hub positioned radially around the first end of the tie rod; and an inlet shroud positioned radially around the first end of the tie rod.

A ram air fan includes a tie rod with a first end and a second end, a motor including a rotor that rotates with the tie rod and a stator positioned radially around the rotor, a fan housing positioned adjacent the first end of the tie rod, and a bearing housing adjacent the second end of the tie rod. The bearing housing includes an inner housing portion centered on a central axis and an outer housing portion centered on the central axis. The inner housing portion has a first end and a second end positioned axially away from the first end. The outer housing portion has a first end and a second end positioned axially away from the first end. The disk portion connects the second end of the outer housing portion to the second end of the inner housing portion. The disk portion includes first cooling holes extending through the disk portion and having a diameter Dh1, and second cooling holes extending through the disk portion and having a diameter Dh2 that is smaller than the diameter Dh1.

The ram air fan of the preceding paragraph can optionally include, additionally and/or alternatively, any one or more of the following features, configurations and/or additional components:

The disk portion includes five of the first cooling holes and four of the second cooling holes.

A ratio of the diameter Dh1 to the diameter Dh2 is between 3.1667 and 3.3367.

The diameter Dh1 is between 1.615 inches (4.1021 centimeters) and 1.635 inches (4.1529 centimeters).

The diameter Dh2 is between 0.49 inches (1.2446 centimeters) and 0.51 inches (1.2954 centimeters).

The outer housing portion includes a radially outer surface with a diameter Doh1, a radially inner surface opposite of the radially outer surface, the radially inner surface having a diameter Doh2, and a shoulder on the first end of the outer housing portion, the shoulder having a radially outer surface with a diameter Ds that is smaller than the diameter Doh1 and larger than the diameter Doh2.

A ratio of the diameter Ds to the diameter Doh1 is between 0.9612 and 0.9621.

A ratio of the diameter Ds to the diameter Doh2 is between 1.0345 and 1.0366.

The diameter Doh1 is between 6.513 inches (16.543 centimeters) and 6.517 inches (16.5532 centimeters).

The diameter Doh2 is between 6.045 inches (15.3543 centimeters) and 6.055 inches (15.3797 centimeters).

The diameter Ds is between 6.264 inches (15.9106 centimeters) and 6.266 inches (15.9156 centimeters).

The bearing housing further includes a mounting flange extending radially outwards from the outer housing portion with tabs, and bolt holes extending through the mounting flange at the tabs.

The bearing housing has three tabs and three bolt holes in the mounting flange.

The inner housing portion includes a radially inner surface with a diameter Dih.

A ratio of the diameter Ds to the diameter Dih is between 2.7692 and 2.7726.

A ratio of the diameter Doh1 to the diameter Dih is between 2.8793 and 2.8836.

The diameter Dih is between 2.26 inches (5.7404 centimeters) and 2.262 inches (5.7455 centimeters).

The ram air fan further includes a journal bearing shaft positioned radially around the second end of the tie rod; a first journal bearing positioned between the journal bearing shaft and the bearing housing; a thrust shaft positioned radially around the first end of the tie rod; a fan rotor attached to a first end of the tie rod that rotates with the tie rod; a second journal bearing positioned between the fan housing and the thrust shaft; a hub positioned radially around the first end of the tie rod; and an inlet shroud positioned radially around the first end of the tie rod.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing housing for a ram air fan, the bearing housing comprising:
    an inner housing portion centered on a central axis, the inner housing portion having a first end and a second end positioned axially away from the first end;
    an outer housing portion centered on the central axis, the outer housing portion having a first end and a second end positioned axially away from the first end, wherein the outer housing portion comprises:
        a radially outer surface having a diameter Doh1;
        a radially inner surface opposite of the radially outer surface, the radially inner surface having a diameter Doh2; and
        a shoulder on the first end of the outer housing portion, the shoulder having a radially outer surface with a diameter Ds that is smaller than the diameter Doh1 and larger than the diameter Doh2;
    a disk portion connecting the second end of the outer housing portion to the second end of the inner housing portion;
    wherein a ratio of the diameter Ds to the diameter Doh1 is between 0.9612 and 0.9621; and
    wherein a ratio of the diameter Ds to the diameter Doh2 is between 1.0345 and 1.0366.

2. The bearing housing of claim 1, wherein:
    the diameter Doh1 is between 6.513 inches (16.543 centimeters) and 6.517 inches (16.5532 centimeters);
    the diameter Doh2 is between 6.045 inches (15.3543 centimeters) and 6.055 inches (15.3797 centimeters); and
    the diameter Ds is between 6.264 inches (15.9106 centimeters) and 6.266 inches (15.9156 centimeters).

3. The bearing housing of claim 1, wherein the inner housing portion includes a radially inner surface with a diameter Dih.

4. The bearing housing of claim 3, wherein:
    a ratio of the diameter Ds to the diameter Dih is between 2.7692 and 2.7726; and
    a ratio of the diameter Doh1 to the diameter Dih is between 2.8793 and 2.8836.

5. The bearing housing of claim 3, wherein the diameter Dih is between 2.26 inches (5.7404 centimeters) and 2.262 inches (5.7455 centimeters).

6. The bearing housing of claim 1, and further comprising:
    a mounting flange extending radially outwards from the outer housing portion with tabs; and
    bolt holes extending through the mounting flange at the tabs.

7. The bearing housing of claim 6, wherein the bearing housing has three tabs and three bolt holes in the mounting flange.

8. The bearing housing of claim 1, wherein the disk portion comprises:
    first cooling holes extending through the disk portion, the first cooling holes having a diameter Dh1; and
    second cooling holes extending through the disk portion, the second cooling holes having a diameter Dh2 that is smaller than the diameter Dh1.

9. The bearing housing of claim 8, wherein the disk portion includes five of the first cooling holes and four of the second cooling holes.

10. The bearing housing of claim 8, wherein a ratio of the diameter Dh1 to the diameter Dh2 is between 3.1667 and 3.3367.

11. A bearing housing for a ram air fan, the bearing housing comprising:
    an inner housing portion centered on a central axis, the inner housing portion having a first end and a second end positioned axially away from the first end;
    an outer housing portion centered on the central axis, the outer housing portion having a first end and a second end positioned axially away from the first end; and
    a disk portion connecting the second end of the outer housing portion to the second end of the inner housing portion, wherein the disk portion comprises:
        first cooling holes extending through the disk portion, the first cooling holes having a diameter Dh1; and
        second cooling holes extending through the disk portion, the second cooling holes having a diameter Dh2 that is smaller than the diameter Dh1.

12. The bearing housing of claim 11, wherein the disk portion includes five of the first cooling holes and four of the second cooling holes.

13. The bearing housing of claim 11, wherein a ratio of the diameter Dh1 to the diameter Dh2 is between 3.1667 and 3.3367.

14. The bearing housing of claim 11, wherein:
    the diameter Dh1 is between 1.615 inches (4.1021 centimeters) and 1.635 inches (4.1529 centimeters); and
    the diameter Dh2 is between 0.49 inches (1.2446 centimeters) and 0.51 inches (1.2954 centimeters).

15. The bearing housing of claim 11, wherein the outer housing portion comprises:
    a radially outer surface with a diameter Doh1;
    a radially inner surface opposite of the radially outer surface, the radially inner surface having a diameter Doh2; and a shoulder on the first end of the outer housing portion, the shoulder having a radially outer surface with a diameter Ds that is smaller than the diameter Doh1 and larger than the diameter Doh2.

16. The bearing housing of claim 15, wherein:
a ratio of the diameter Ds to the diameter Doh1 is between 0.9612 and 0.9621; and
a ratio of the diameter Ds to the diameter Doh2 is between 1.0345 and 1.0366.

17. The bearing housing of claim 15, and further comprising:
a mounting flange extending radially outwards from the outer housing portion with tabs; and
bolt holes extending through the mounting flange at the tabs.

18. The bearing housing of claim 15, wherein the inner housing portion includes a radially inner surface with a diameter Dih.

19. The bearing housing of claim 18, wherein:
a ratio of the diameter Ds to the diameter Dih is between 2.7692 and 2.7726; and
a ratio of the diameter Doh1 to the diameter Dih is between 2.8793 and 2.8836.

20. A bearing housing for a ram air fan, the bearing housing comprising:
an inner housing portion centered on a central axis, the inner housing portion having a first end, a second end positioned axially away from the first end, and a radially inner surface with a diameter Dih;
an outer housing portion centered on the central axis, the outer housing portion having a first end and a second end positioned axially away from the first end, wherein the outer housing portion comprises:
a radially outer surface having a diameter Doh1;
a radially inner surface opposite of the radially outer surface, the radially inner surface having a diameter Doh2; and
a shoulder on the first end of the outer housing portion, the shoulder having a radially outer surface with a diameter Ds that is smaller than the diameter Doh1 and larger than the diameter Doh2; and
a disk portion connecting the second end of the outer housing portion to the second end of the inner housing portion;
wherein a ratio of the diameter Ds to the diameter Dih is between 2.7692 and 2.7726; and
wherein a ratio of the diameter Doh1 to the diameter Dih is between 2.8793 and 2.8836.

* * * * *